July 19, 1966     H. CANCRINUS     3,261,233

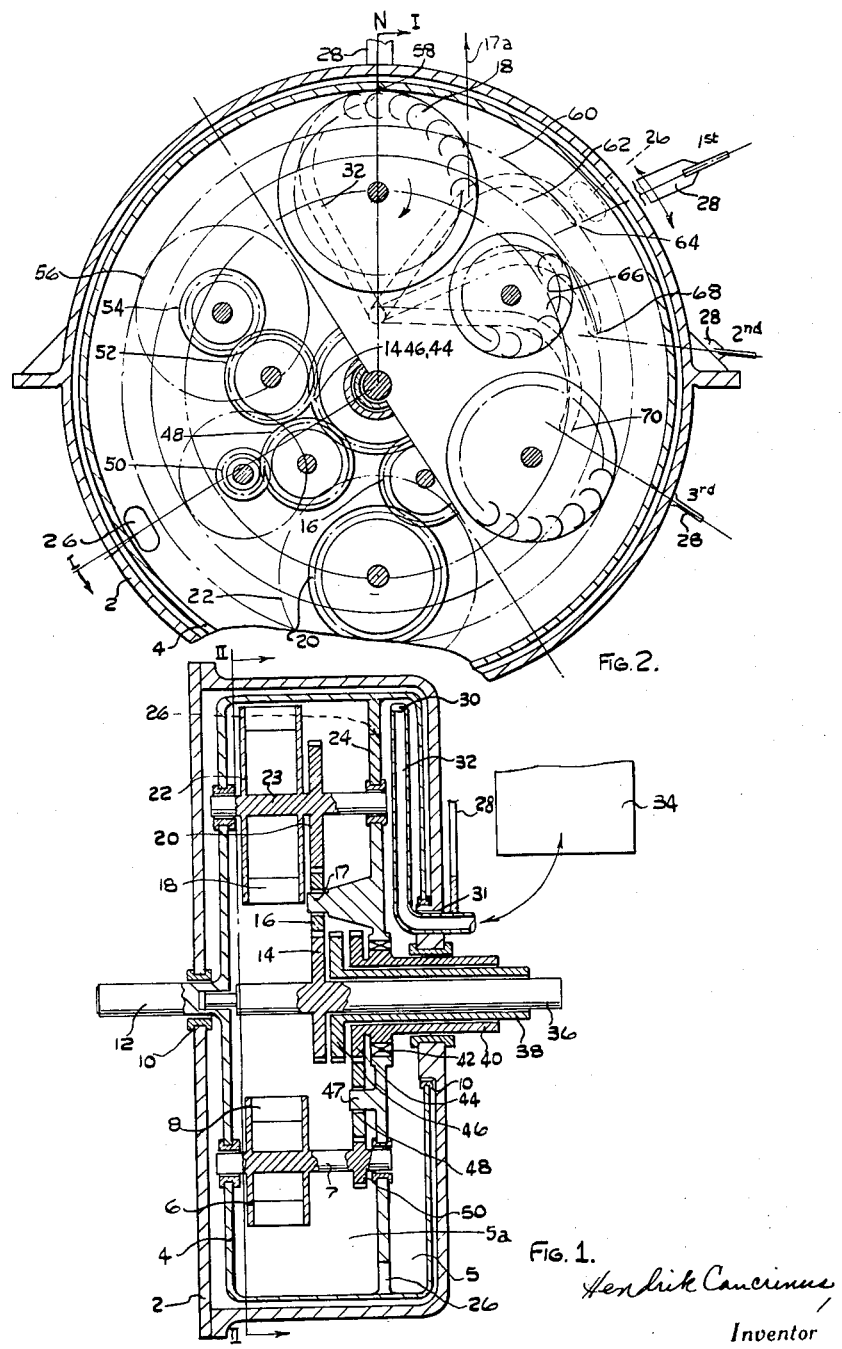

INERTIA FLUID TORQUE TRANSMITTER

Filed June 25, 1962     6 Sheets-Sheet 2

Hendrik Cancrinus
Inventor

Attorneys

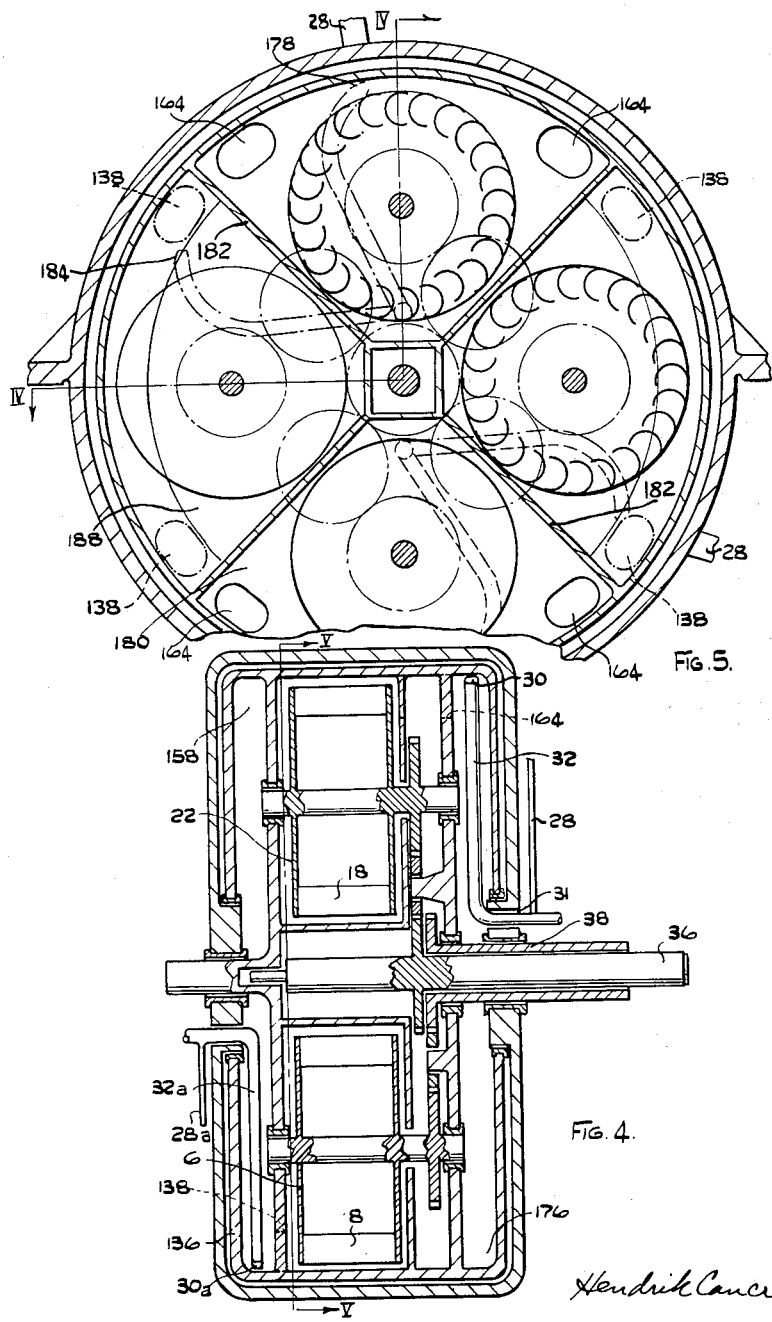

Hendrik Cancrinus
Inventor

By Wenderoth,
Lind & Ponack, Attorneys

July 19, 1966 H. CANCRINUS 3,261,233
INERTIA FLUID TORQUE TRANSMITTER
Filed June 25, 1962 6 Sheets-Sheet 5

Hendrik Cancrinus,
Inventor

By Wendroth
Lind & Ponack Attorneys

July 19, 1966  H. CANCRINUS  3,261,233
INERTIA FLUID TORQUE TRANSMITTER
Filed June 25, 1962  6 Sheets-Sheet 6
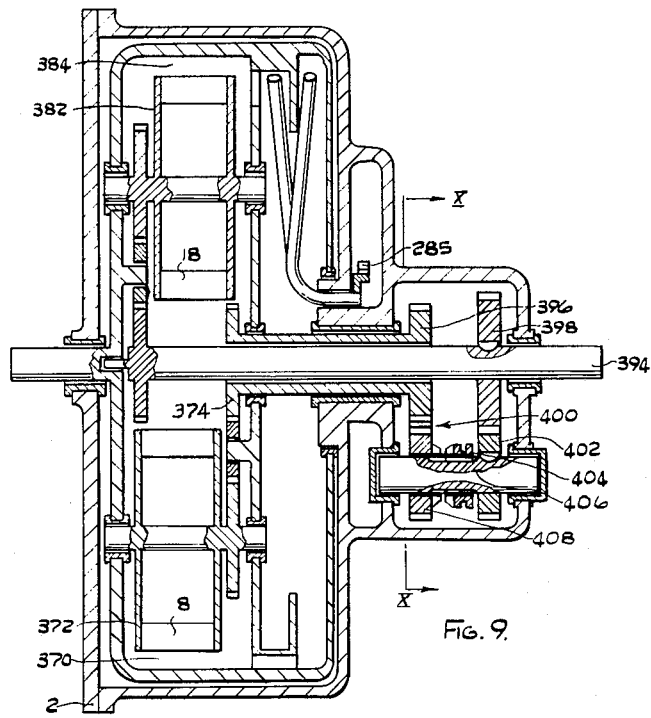
FIG. 9.
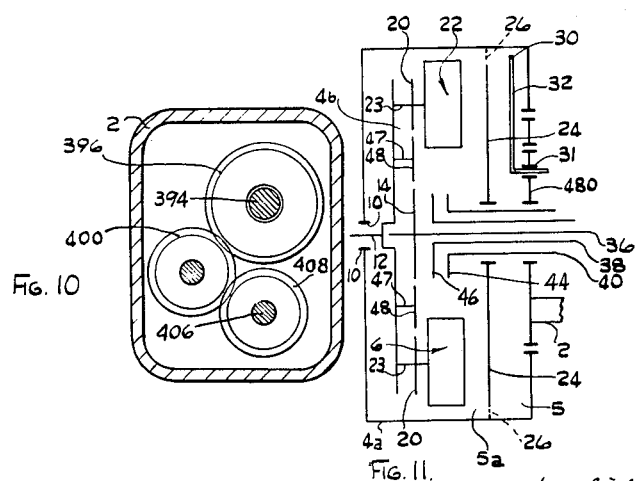
FIG. 10.
FIG. 11.
Hendrik Cancrinus,
Inventor
By Wenderoth,
Lind & Ponack Attorney

# United States Patent Office 3,261,233
Patented July 19, 1966

3,261,233
INERTIA FLUID TORQUE TRANSMITTER
Hendrik Cancrinus, Hazendal, Cape Town, Republic of South Africa, assignor to Inpower Works (Proprietary) Limited, a company incorporated of South-West Africa
Filed June 25, 1962, Ser. No. 204,711
Claims priority, application Republic of South Africa, July 3, 1961, R 61/478
20 Claims. (Cl. 74—774)

This invention relates to apparatus for transmitting torque by inertia by means of a hydraulic fluid.

According to the invention a torque transmitter includes a carrier in the form of a drum adapted to contain hydraulic fluid and mounted to rotate about its axis; means for connecting the carrier to a source of rotary power; at least two sets of liquid retainer wheels in the drum, each liquid retainer wheel having a plurality of retainers spaced about its axis and being mounted on the carrier to rotate about its own axis which is spaced away from the carrier axis; for each set of liquid retainer wheels, a sun wheel coaxial with the carrier axis and mounted to rotate about its axis relatively to the carrier; for each sun wheel, an output shaft fast and coaxial with the sun wheel, the several sun wheels and output shafts being coaxial; drive connecting means connecting each sun wheel with its set of associated liquid retainer wheels for the transmission of torque between the said liquid retainer wheels and the said sun wheel, the drive connecting means and liquid retainer wheels being mounted in dynamic balance about the carrier axis; and control means to control the disposition of hydraulic fluid in the drum independently for each set of liquid retainer wheels, the fluid being flung out under the action of centrifugal force during rotation of the drum about its axis; whereby, during rotation of the drum about its axis and of the liquid retainer wheels about their axes relatively to the drum, the retainers of the liquid retainer wheels are adapted to pass through the annular layer of liquid in the drum and to receive liquid into them from a region in the drum on the remote side of the liquid retainer wheel axis relative to the drum axis and to retain liquid in them under the action of centrifugal force and to reject retained liquid on the near side of the liquid retainer wheel axis relative to the drum axis; and whereby the sets of liquid retainer wheels are adapted to generate torque about their axes, the generation of torque by the sets of liquid retainer wheels being controllable for each set independently by means of the control means, by controlling the disposition of the fluid in the drum relatively to the sets of liquid retainer wheels.

The drive connecting means between a liquid retainer wheel and its associated sun wheel may comprise a toothed gear train including a toothed planet wheel fast and coaxial with the liquid retainer wheel, and an idler wheel, both the said wheels being mounted to rotate about axes parallel to the liquid retainer wheel and sun wheel axes. The ratio of planet wheel gear teeth to sun wheel gear teeth may vary from one set of planet wheels and associated sun wheel to another.

The drum may have at least one partition dividing it into a plurality of compartments, separate sets of liquid retainer wheels being disposed in separate compartments.

The control means may include fluid control means for each compartment whereby the depth of a layer of fluid in each compartment may be controlled; each fluid control means comprising a duct having a leading inlet end inside the compartment and an outlet end outside the compartment, a reservoir, a connection connecting the outlet end to the reservoir, and a control outside the drum for controlling the depth of immersion of the leading end of the duct, in the layer of fluid in the compartment and whereby the leading inlet end of the duct may be immersed in the layer of fluid and withdrawn from it and whereby liquid may be withdrawn from the compartment and charged into the reservoir, and vice versa.

Alternatively, the control means may include a passage connecting at least two compartments, a scoop within the drum, a control outside the drum and connected to the scoop for displacing it within the drum, whereby the depth of immersion of the scoop in an annular layer of fluid in the one compartment may be controlled and whereby fluid may be deflected by the scoop from the one compartment to the other via the passage during rotation of the drum.

The planet wheel sets may be set at different distances from the drum axis and the spacing of the liquid retainers away from the liquid retainer wheel axes of one set may differ from the similar spacing of another liquid retainer wheel set i.e. the liquid retainer wheels may be of different diameter or of the same diameter but having liquid retainers of different size.

Further according to the invention a torque transmitter includes a drum adapted to contain hydraulic fluid; a carrier inside the drum and coaxial with it, a plurality of liquid retainer wheels having each a plurality of liquid retainers spaced about its axis and mounted in the carrier in sets to rotate about their axes spaced away from and parallel to the drum axis; a sun wheel for each set of liquid retainer wheels and coaxial with the drum axis, an output shaft for each sun wheel and fast and coaxial with it, the output shafts of the several sun wheels including one or more sleeves around a central shaft; drive connecting means connecting each set of liquid retainer wheels to its associated sun wheel for the transmission of torque between liquid retainer wheels and sun wheels and comprising a toothed gear train including a toothed planet wheel fast and coaxial with a liquid retainer wheel and an idler wheel mounted to rotate about an axis parallel to the liquid retainer wheel and sun wheel axis; whereby during rotation of the carrier about its axis causes liquid within the drum to be flung out under the action of centrifugal force into an annular layer around the drum periphery, and whereby relative rotation between an output shaft and the drum results in the liquid retainer wheels associated with that output shaft rotating about their axes and the liquid retainers of the liquid retainer wheels receiving liquid into them from the annular layer at a region in the drum on the remote side of the liquid retainer wheel axis relative to the drum axis and retaining liquid in them under the action of centrifugal force and rejecting retained liquid on the near side of the liquid retainer wheel relative to the drum axis. The carrier and drum may be integral, and the drum may have at least one partition dividing it into a plurality of axially spaced compartments, the separate sets of liquid retainer wheels being disposed in separate compartments.

The drive connecting means may comprise a planet and sun wheel sprocket and chain drive, or a toothed idler gear wheel in mesh with a toothed gear planet wheel fast with the bucket wheel and with the sun wheel, the idler gear wheel in mesh with a toothed gear planet wheel fast with the drum.

Further features of the invention will appear from the following description of specific embodiments with reference to the accompanying drawings.

In the drawings:
FIGURE 1 shows a sectional side elevation at I—I;
FIGURE 2 shows a sectional end elevation at II—II;
FIGURE 3 shows a sectional side elevation of apparatus similar to that shown in FIGURE 1 but with integral gear box;

FIGURE 4 shows a sectional side elevation at IV—IV of another embodiment which is a variation of that shown in FIGURE 1;

FIGURE 5 shows a sectional end elevation at V—V corresponding to FIGURE 4;

FIGURE 9 shows a sectional side elevation of a yet further embodiment;

FIGURE 10 shows a sectional end elevation at X—X, of the embodiment shown in FIGURE 9.

FIGURE 11 shows diagrammatically in sectional side elevation an embodiment corresponding to that shown in FIGURE 1 but with drum and carrier separate.

Figure 3:
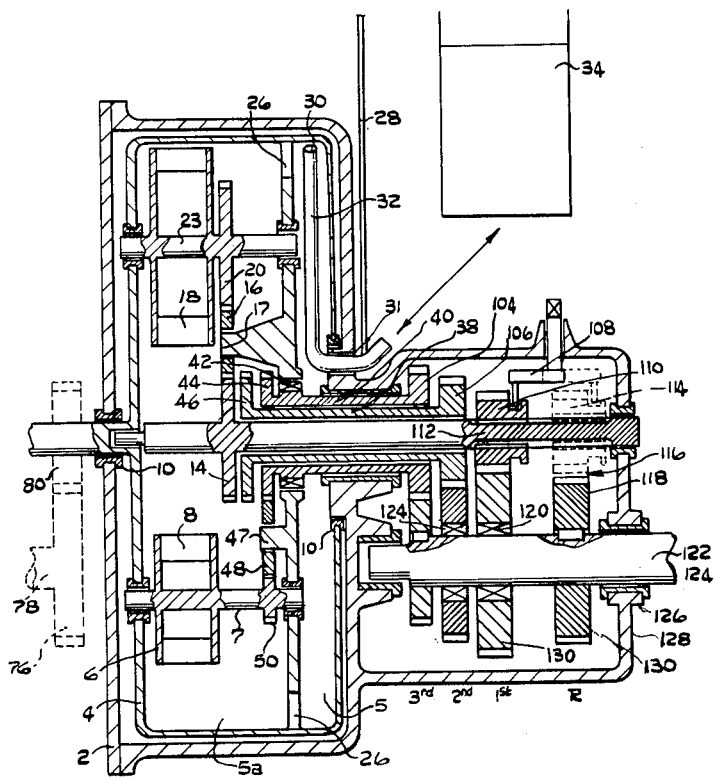

Liquid retainers in the form of buckets have been shown in the various drawings of the invention. However, vanes and co-operating shrouds can also act as liquid retainers and in this connection reference is made to FIGURE 12 and the relevant description. A bucket is merely a special form of liquid retainer and hence a bucket wheel is a special form of liquid retainer wheel.

Referring to FIGURE 1 of the drawings, frame 2 supports drum 4 rotatably in bushes 10 about the common axis of input shaft 12 and output shaft 36. Inside the drum 4 there are mounted a plurality of bucket wheels 6, 22, for rotation about the axes of their shafts 7 and 23. The bucket wheels have buckets 8 and 18 spaced circumferentially about their axes. Fast with shafts 7 and 23 are planet gearwheels 50 and 20 which mesh with idlers 48 and 16. These idlers are mounted to rotate about pins 47 and 17 fast with drum 4, and are also in mesh with coaxial sun wheels 44 and 14. These sun wheels are axially spaced, 14 being fast with centrally disposed output shaft 36, and 44 being fast with sleeve 40 which is coaxial with and around output shaft 36. Sun wheel 46 is fast with sleeve 38 which is coaxial with and between sleeve 40 and shaft 36, and also is in mesh with an idler and bucket wheel similar to 16 and 48, and 6 and 22. A pair of opposed bucket wheels 22 are provided for balance, and so also bucket wheels 6 (see FIGURE 2), and a pair of bucket wheels 56 and idlers 52 for sun wheel 46.

Inside the drum 2 there is provided an outwardly directed pipe 32 having an opening 30 whose radial distance from the rotational axis can be varied by means of handle 28 by arcuate displacement about the axis of opening 31 in frame 2. The pipe 32 is disposed in a compartment 5 of the drum 4, the compartment 5a connecting with compartment 5 via connecting openings 26.

In operation, referring to FIGURES 1 and 2 of the drawings, hydraulic fluid is placed inside the drum 4. When power is applied to the input shaft 12 with a turning movement in an anti-clockwise direction when looking in the direction II—II, the drum 4 will rotate with the input shaft 12 carrying the idlers 16, 48, and 52 with it. If the output shaft 36 i.e. sun wheel 14 is stationary the idler wheels 16 will rotate about their axes in an anti-clockwise direction thus causing the planet wheels 20 to rotate in a clockwise direction about their own axes relative to the idler wheels. They are also carried around by the drum 4 about the input shaft axis such that for every revolution of the drum 4 in one direction about its axis, the planet wheels 20 perform each a revolution in the opposite direction about its shaft when sun and planet wheel teeth are equal in number. The planet thus performs a motion which may be termed "circular translation." Centrifugal force acts on the hydraulic fluid within the drum 4 when it rotates to fling it out in an annular layer. The buckets 18 move through the hydraulic fluid layer in a clockwise direction about the axis of planet wheel 20, and scoop up fluid in them. Due to the rotation of the drum 4 about the axis of input shaft axis (and about its own axis) centrifugal force in direction of arrow 17a (see FIGURE 2) is exerted on the fluid in these buckets, and so provides an anti-clockwise torque about the planet wheel axis. This torque is transmitted through idler 16 onto sun wheel 14 to be available as an output torque on output shaft 36, in an anti-clockwise direction about the output shaft axis, i.e. in the same direction as the input torque.

During circular translation the direction of the centrifugal force on the fluid in all the buckets 18 of the bucket wheels 22, is parallel to the line joining the planet wheel and sun wheel axes as indicated by arrow 17a. However, as the sun wheel and its connected output shaft speed up, so tht planet wheel rotation about its axis relative to the carrier for every rotation of the carrier about its axis becomes less and less, until it no longer rotates about its axis relative to the carrier, that is when the sun wheel 14 and its connected output shaft 14 rotate at the same speed as the carrier. During this speed-up period, the direction of the centrifugal force changes gradually, so that at unity velocity ratio between the carrier and the output shaft 14, the direction of the centrifugal force acting on the fluid in the buckets 18 is directed substantially radially outwardly from the carrier axis. At this full speed, therefore, the centrifugal force on the fluid in the various buckets will vary from bucket to bucket in bucket wheel 22, both in magnitude and direction.

The action on the other planet, bucket, and idler wheels is similar, resulting in output torques being available on sleeves 38 and 40.

But in view of the fact that the other planet wheels are smaller than their associated sun wheels, circular translation for these planet wheels will take place at speeds of their output shafts determined by the ratios of their numbers of teeth to the numbers of teeth of their associated sun wheels. In other words, depending upon the number of teeth of, say planet wheel 54 (which must be less than the number of teeth of the associated sun wheel 46 as shown in FIGURES 1 and 2 of the drawings) the output shaft 38 connected to this sun wheel 46 will have a definite speed at which the planet wheel 54 will rotate once about its axis in the reverse direction relative to the carrier for every forward rotation of the carrier about its axis, that is when the planet wheel 54 and its associated bucket wheel 56 perform circular translation. Again, as described before for bucket wheel 22, during circular translation of bucket wheel 56, the direction of centrifugal force on fluid in the buckets of bucket wheel 56 will be parallel to the line joining the axes of the bucket wheel 56 and the sun wheel 46. Again (as described before for output shaft 14), as output shaft 38 speeds up, so the centrifugal force acting on the fluid in the buckets of bucket wheel 56 will change in magnitude and direction until finally the centrifugal force is directed substantially radially outwardly from the axis of the carrier, when the output shaft 38 rotates at the same speed as the carrier. The next stage, comprising sun wheel 44, idlers 48, planet wheels 50, and bucket wheels 6, is arranged to take over the generation of torque, once the output shaft 38 rotates at about the same speed as the carrier.

The stages are arranged such that during start-up, the bucket wheels of a succeeding stage come into circular translation at about the time when the output shaft of a preceding stage rotates at the same speed as the carrier. A stage is ready to take over the generation of torque when it comes into circular translation.

FIGURE 1 shows a coupling in which a liquid layer of adjustable thickness is used in conjunction with three planetary systems. Stationary frame 2 holds rotating drum 4 which, in this example, is fast with input shaft 12. Eccentrically mounted in the frame 2 is a pipe 32 whose opening 30 in its leading end points against the direction of movement of drum 4. This pipe is flexibly connected to reservoir 34. When the drum revolves without containing liquid, it can receive liquid from the reservoir 34 through opening 30 of pipe 32 until the drum contains a layer of liquid having a depth reaching to approximately the centre of opening 30. The speed of the rotating drum and the liquid within the drum will cause pressure inside the pipe to balance the pressure from the reservoir and prevent further flow of liquid from the reservoir into the drum through opening 30. An excess of liquid in the drum is picked up by the pipe and transferred into the reservoir. The depth of liquid layer within the drums can thus be controlled by displacing the pipe opening 30 further or nearer to the cylinder wall of the drum 4. This displacement may be done by handle 28.

In FIGURE 2 different positions of the pipe opening are shown for different operating conditions. In position 58 almost all the liquid is out of the drum and none of the bucket wheels are touching the liquid, therefore no torque can be developed and the coupling is in the so-called neutral position. By bringing the opening of the pipe into position 64, a liquid layer 69 is introduced into the drum thus allowing bucket wheels 22 to pick up liquid to develop torque, which torque is brought over to output shaft 36 via gear wheel 20, idler 16, and sun wheel 14. (So-called 1st position.) By bringing the opening of the pipe into position 64, a liquid layer 60 is introduced into the drum, allowing the buckets of bucket wheels 56 to receive liquid and develop torque onto output sleeve 38 via gear wheel 54, idler 52, and sun wheel 46. (So-called 2nd position.) As can be seen from the drawing, layer 62 is of greater depth than layer 60. By bringing the opening of the pipe into position 70, a liquid layer 66 of yet greater depth is introduced into the drum allowing the buckets 8 of bucket wheels 6 to receive liquid and develop torque on the output sleeve 40 via gear wheel 50, idler 48, and sun wheel 44. (So-called 3rd position.)

Each planetary system is made to function in circular translation after its output shaft has reached a certain speed ratio relative to the input shaft, because of and dependent on the ratios between planet wheels and sun gears. By means of these ratios it is possible to develop the same torque as on the first stage with smaller bucket wheels.

In FIGURE 3 this coupling as described is used in conjunction with a gearbox, where each output shaft or sleeve is drivingly associated with an output shaft 122 via different gear ratios, 104 and 126; 106 and 128; 110 and 130; and 118 and 110 in position 114. The position of 110 is adjustable by means of selector lever 108. In a "neutral" position N of handle 28, pipe 32 has its opening 30 at 58 and hence there is no fluid in the drum during its rotation. Hence no torque is developed in the coupling and therefore also no torque appears at the output lay shaft 122. In the 1st gear position of pipe 32, i.e. inlet opening in position 64, fluid enters the drum to the first magnitude 60 (see FIGURE 2) so that the torque is developed via sun wheel 14 onto shaft 112, a multiple of the coupling torque, dependent upon the ration of the gears 110 and 130, is developed onto the output lay shaft 122. A feature of the coupling is its tendency to give the sun wheel the same speed as the prime mover. This means that the output lay shaft 122 will reach a speed proportional to the ratio of the gears 110 and 130 of the prime mover speed.

By allowing fluid to enter the drum to the second magnitude 62 (see FIGURE 2) the buckets of bucket wheel 56 (which is fast with planet wheel 54 meshing with sun wheel 46) receive liquid, and thereby develop torque, this torque is brought over via the gear ratio 106 and 128 to output lay shaft 122. As this gear ratio is smaller than the first mentioned gear ratio, the output lay shaft 122 will over-run the speed of gear 130, which is made possible by freewheel 120. The planet wheels in the coupling, drivingly associated with gear 130, will, because of this freewheel, be stationary relative to the drum. The output lay shaft 122 will now obtain a speed proportional to the ratio of the gears 106 and 128 of the prime mover speed.

By introducing fluid into the coupling to the third magnitude 66 (see FIGURE 2), planet wheel buckets operating on sun wheel 44 are allowed to receive liquid, and thereby develop torque, this torque is brought over via the gear ratio 104 and 126 to output lay shaft 122. As this gear ratio is smaller than the mentioned first and second stage gear ratios, the output lay shaft 122 will over-run the gears 128 and 130. This is made possible by freewheels 124 and 120. The planet wheels in the coupling drivingly associated with gears 130 and 128 will, because of these freewheels, be stationary relative to the drum. The output shaft 122 will now obtain a speed proportional to the ratio of the gears 104 and 126 of the prime mover speed.

To enable a brake action against prime mover "compression" to be applied, a freewheel 42 may be introduced between the sleeve 40 and drum 4. As the drum is fast with input shaft 12, sleeve 40 is prevented from over-running input shaft 12. If it is desired to allow the planet wheels to lose their torque by taking fluid out of the drum, i.e. third magnitude back to second magnitude, and so on, small holes may be provided in the buckets 8 and 18, allowing the liquid to leak out of the bucket wheels and thus finally eliminating the torque on the planet wheels.

Reverse can be engaged by having the pipe 32 in the neutral position and by moving gear 110 into position 114 by means of handle 108. A reversing gear (see arrow 116 in FIGURE 3) is provided and meshes with gear 118 and with gear 110 when in position 114.

FIGURES 4 and 5 show the introduction of two separate planetary systems forming two couplings in one unit, each system controlled separately so that torque can be applied to output shaft 36 or sleeve 38 or on both, as desired. The drum 136 is divided by the walls or partitions 182 into four compartments. Two opposing compartments are connected to each other via openings 138 and annular channel 158. The other two opposing compartments are connected via openings 164 and annular channel 176. The level of liquid introduced into channel 176, via pipe 32, may be controlled by positioning the pipe opening 30 in a manner similar to that described above. When the pipe opening is in position 178, FIGURE 5, almost all the liquid is out of channel 176 and thus the compartments 180 are also empty, and hence the bucket wheels 22 in these compartments are unable to develop any torque. If the pipe opening is set to position 184, the liquid enters the compartments 180, to a level to permit the buckets 18 to receive fluid, and thus torque can be developed on the output shaft 36.

Similarly, the opposing compartments 188 can be filled or emptied by pipe 32a, the level of the liquid within these two compartments being controlled by pipe opening 30a in channel 158. As mentioned previously, small holes provided in the buckets or scoops 8, 18 will allow the liquid to be discharged from the bucket wheels and so annul the torque on the planet wheels if it is desired to remove liquid from the compartments.

Figure 7:
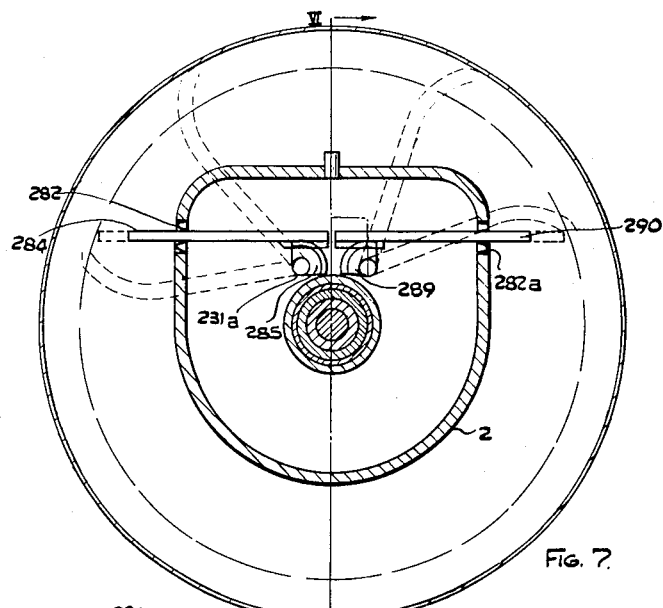
FIGURE 7 shows a sectional end elevation at VII—VII corresponding to FIGURE 6.
Figure 6:
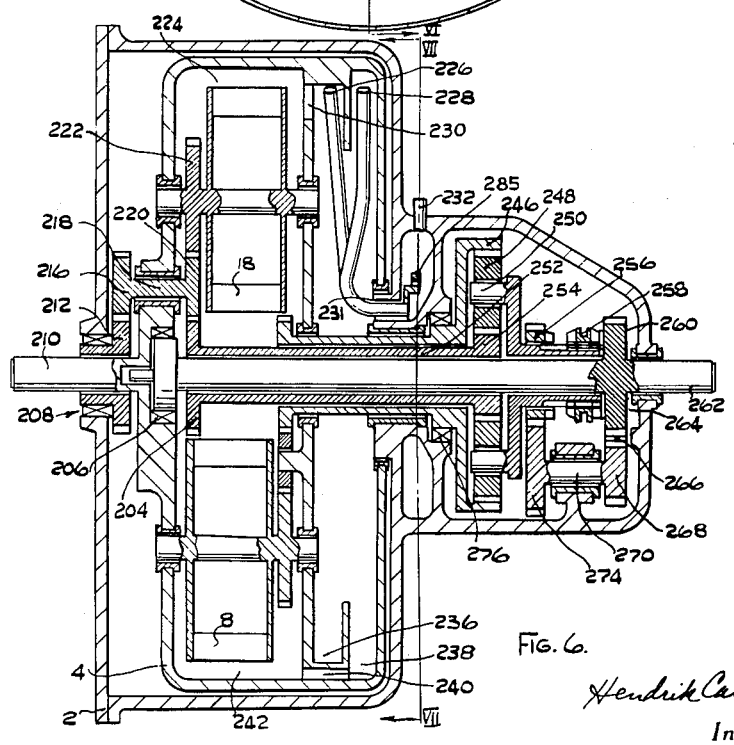
FIGURE 6 shows a sectional side elevation at VI—VI of other apparatus embodying the features of the apparatus shown in FIGURES 4 and 5 but with an integral gear box.

FIGURES 6 and 7 show a coupling similar to the coupling described with reference to FIGURES 4 and 5, combined with differential gearing to provide a torque/speed transmission in three stages. The two pipes servicing the liquid supply to the two sets of compartments are placed next to each other in separate annular channels 236 and 238. Channel 236 is connected to the compartments 224 via opening 230 and channel 238 is connected to the compartments 242 via opening 240. If liquid is present in compartment 224, torque can be developed on differential sun wheel 254 via sleeve 252, coupling sun wheel 204, idler wheel 220 and planet wheel 222. Spider 250 is connected to output shaft 262. A torque action on differential sun wheel 254, will cause a torque of opposite sense on internal or ring gear 246 via spider 250 and planetary gears 248. Displacement of ring gear 246 in this direction, it prevented by a one-way locking device 276 operating between ring gear 246 and frame 2.

Liquid introduced into compartments 242 whilst the liquid of the compartments 224 is being removed, causes a torque to be transmitted to ring gear 246. This torque has the tendency to reverse the movement of sungear 254 but is prevented from so doing by the one-way locking device 208, between gear 212 and frame 2 by way of example. Sungear 254 is connected to gear 212 via sleeve 252, sungear 204, idler gear 220, shaft 218, and a second idler gear 216. Although shaft 218 is mounted in a rotating drum 4, if the diameters of the idler gears 220 and 216 are the same, the speed of the sungear 204 and the gear 212 will also be the same.

When the torque is applied to the sungear 254 of the differential gearing and the ring gear 246 is stationary, the spider is in effect in "first gear." When the torque is applied to the ring gear 246 and the sun gear 254 is stationary, the spider 250 is in effect in "second gear." By introducing liquid into both sets of compartments 242 and 224, both sungear 254 and ring gear 246 are driven at the same speed and in the same direction, thus causing the spider 250 also to turn with the same speed and in the same direction and provides "direct drive." In the coupling as well as in the differential gearing, there are no relative moving parts when in direct drive.

When all compartments are empty, i.e. the "neutral position" reverse can be selected by engaging a reversing mechanism from spider bush 260 via clutch 258 to gear 256, gear 274, shaft 270, gear 268, reversal gear 266 (not shown in drawing), and output gear 264. With this mechanism three forward and three reverse gears can be obtained. To allow running against compression, an over-running sprag or freewheel 205 is mounted between output shaft 262 and input shaft 210. Pipe 232 is connected to a reservoir.

The depth of liquid within the drum 4 may be controlled by pivoting tubes 228 and 226 about the axis of opening 231 and of 231a in frame 2 by means of slidable toothed racks 284 and 290 engaging with toothed segments 285 and 289. The racks have handle extensions passing through glands 282 and 282a in frame 2.

Figure 8:
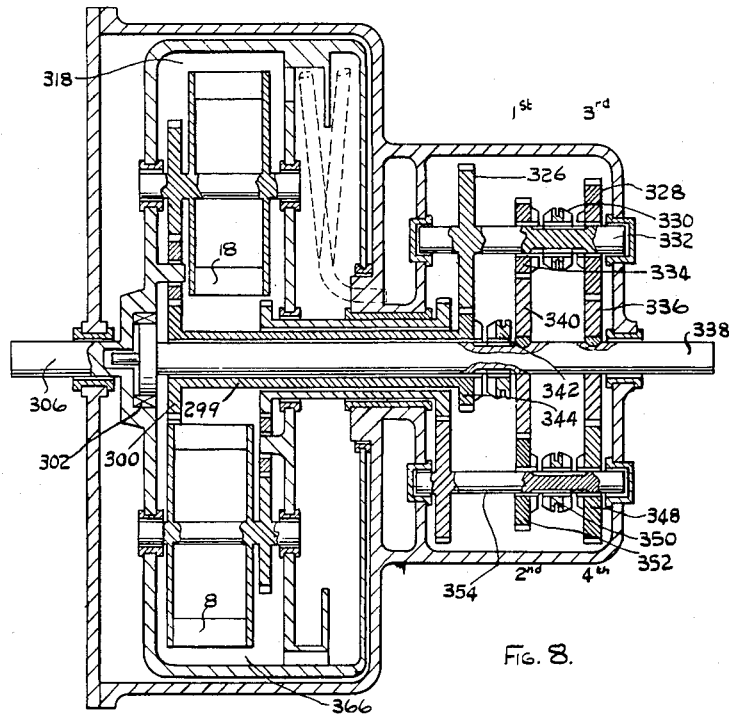
FIGURE 8 shows a sectional side elevation of yet a further embodiment.

A further embodiment of the coupling shown in FIGURES 4 and 5 is shown in FIGURE 8 where one planetary system is connected to a secondary shaft 332 and the other planetary system is connected to a secondary shaft 354. When torque from the coupling is supplied to one of these secondary shafts, then the other shaft is void of any torque, then a gear may be preselected on the shaft void of torque. It is therefore possible to shift from one torque to another on the output shaft without interruption of torque on the output shaft 338.

If liquid is supplied to compartments 318, a torque is supplied to secondary shaft 332 via gear 326, gear 344, sleeve 299 and sungear 300. Supposing synchromesh coupling 330 had already been engaged with gear 334, then the torque of secondary shaft 332 is brought over to output shaft 338 via gear 340 thus giving "first gear." Meanwhile, synchromesh coupling 350 can be engaged with gear 352 which forms the "second gear" to the output shaft via gear 340. By taking liquid out of compartments 318 and at the same time introducing liquid into compartments 366 (assuming that compartments 366 were previously empty) the torque goes over from first gear to second gear without interruption of torque on output shaft 338. When the second gear is engaged, the "third gear" formed by synchromesh coupling 330, gear 328 and gear 336 can, meanwhile, be preselected. Removal of liquid from compartments 366 and its introduction into compartments 318, will cause the torque to go over from "second gear" to "third gear" without interruption of torque on output shaft 338. The same applies to the fourth gear formed by coupling 350, gear 348 and gear 336. From the "fourth gear" a "direct drive" can be engaged by clutch means in the form of synchromesh coupling 342 with wheel 344.

Only five velocity ratios have been described here. It is clear that any convenient number of gear ratios can be used if desired. Instead of all gears being used for forward drive, one or more gears, in conjunction with a reversal mechanism, can be used for reverse drive. Means may be provided to allow for running against engine compression, for example (1) One way is by making use of the resistance of the liquid in the drum against the buckets through any of the gear ratios. With this method heat will be developed in the coupling and provision will have to be made therefor.

(2) Another way is by the introduction of an overrunning sprag or freewheel 302 between output shaft 338 and input shaft 306.

Yet another development of the coupling shown in FIGURES 4 and 5 is shown in FIGURES 9 and 10. This unit is a reversal mechanism and can find ready application in transport, industry and elsewhere. Direct drive occurs when liquid is brought into compartments 384. Planet wheels 382 supply the torque to output shaft 394. Meanwhile gear 396 is free of any torque. To obtain reverse on output shaft 394, synchromesh coupling 404 is engaged with gear 408. Removal of liquid from compartment 384 whilst liquid is introduced into compartment 370, will cause busket wheel 372 to develop a torque on sun wheel 374 which torque is brought over via gear 396, reversal gear 400, gear 408, shaft 406, gear 402 to gear 398 onto the output shaft 394. All these systems allow for smooth take-over of torque from one ratio to another. (Reversal gear 400 is not shown in FIGURE 9.)

Referring to FIGURE 11, there is shown diagrammatically in sectional side elevation an embodiment similar to that shown in FIGURES 1 and 2, except that in FIGURE 11 there is shown a loose drum 4a within which there is provided the carrier 4b, in which the planet wheels, such as 20, and idler wheels such as 48, are mounted. The other reference numerals relate to the same parts as shown in FIGURES 1 and 2. The embodiments shown in the drawings other than FIGURE 11, all have a drum 4 which performs also the functions of the carrier 4b of FIGURE 1, i.e. the drum 4 is in fact a drum cum carrier. The plate 480 through which the pipe 32 passes could be fast with a frame 2 as shown. (See also FIGURE 1.)

Figure 12:
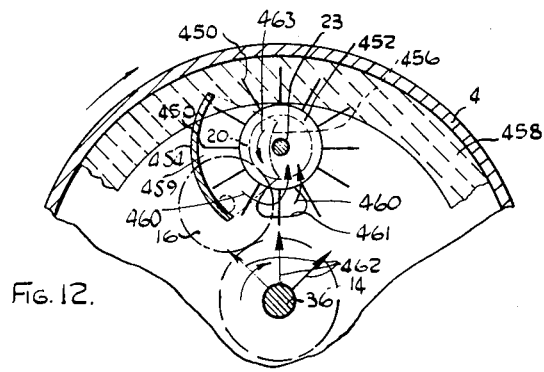
FIGURE 12 shows a diagrammatic detail of a liquid retainer wheel alternative to the bucket wheels shown in the other drawings.

Referring to FIGURE 12 of the drawings, it will be noted that liquid retainers are comprised of vanes 450 fast with vane wheel 452 which in turn is fast with a planet wheel such as 20. This is in contradistinction to the bucket type liquid retainers shown in the other drawings. A shroud 454 is fast with the carrier (or with the drum where that functions also as a carrier). The shroud is shown cut away but has a lip 456. In operation the vanes 450 pass through annular layer of liquid 458 inside the drum, and trap or retain some of it in pockets 459 between the vanes 450 and in shroud 454 under the action of centrifugal force when the drum 4 rotates and relative rotation in the direction of arrow 463 takes place between the drum and vane wheel 452. Previously trapped liquid will escape as at arrow 460, shroud 454, or through the action of centrifugal force directed away from the axis of the device i.e. away from the axis of shaft 36, as indicated by arrows 462. The liquid may escape outside the shroud or via an opening or openings 461 provided in the side of the shroud. In other words, fluid is received by the liquid retainer means (vanes with shroud) from the annular layer of fluid 458 i.e. from a region in the drum 4 on the remote side of the liquid retainer wheel axis relative to the drum axis (coincident with the axis of shaft 36), they retain liquid in them under the action of centrifugal force and reject retained liquid on the near side of the liquid retainer wheel axis relative to the drum axis. Instead of bleed openings being provided in vanes, the clearance between the vanes 450 and the shroud and lip provide such bleed openings.

By way of explanation, it may be mentioned, that in performing circular translation, a planet wheel and its attached liquid retainer wheel or bucket wheel remain in the same position relative to their common axis throughout their orbit around the axis of their associated sun wheel. Liquid retainers (buckets) on one side of the liquid retainer wheel will retain liquid during orbiting of the liquid retainer wheel around the sun wheel axis. Centrifugal force acting on the mass provided by the liquid in the liquid retainers provides a torque on the sun wheel via the attached planet wheel and meshing idler wheel. If fluid is permitted to leak out slowly, for example, through perforations provided in the buckets or via clearance spaces between vanes and shroud, then the bucket wheel will deviate slightly from no relative movement position between input and output shafts, because the fluid in the bucket wheel will have to be continually replenished from the annular layer if a torque is to be developed. If no annular layer of liquid is available, the liquid having been withdrawn via pipe 32, then the bucket wheel will merely lose its liquid and no torque will be developed. If relative movement takes place this results in a difference in speed between input and output shafts.

I claim:
1. A torque transmitter which includes
  (a) a carrier in the form of a drum adapted to contain hydraulic fluid and mounted to rotate about its axis;
  (b) means for connecting the carrier to a source of rotary power;
  (c) at least two sets of liquid retainer wheels in the drum, each liquid retainer wheel having a plurality of retainers spaced about its axis and being mounted on the carrier to rotate about its own axis which is spaced away from the carrier axis;
  (d) for each set of liquid retainer wheels, a sun wheel co-axial with the carrier axis and mounted to rotate about its axis relatively to the carrier;
  (e) for each sun wheel an output shaft fast and co-axial with the sun wheel, the several sun wheels and output shafts being coaxial;
  (f) drive connecting means connecting each sun wheel with its set of associated retainer wheels for the transmission of torque between the said liquid retainer wheels and the said sun wheel, the drive connecting means and liquid retainer wheels being mounted in dynamic balance about the carrier axis; and
  (g) control means to control the disposition of hydraulic fluid in the drum independently for each set of liquid retainer wheels, the fluid being flung out under the action of centrifugal force during rotation of the drum about its axis;

whereby, during rotation of the drum about its axis and of the liquid retainer wheels about their axes relatively to the drum, the retainers of the liquid retainer wheels are adapted to pass through the annular layer of liquid in the drum and to receive liquid into them from a region in the drum on the remote side of the liquid retainer wheel axis relative to the drum axis and to retain liquid in them under the action of centrifugal force and to reject retained liquid on the near side of the liquid retainer wheel axis relative to the drum axis; and whereby the sets of liquid retainer wheels are adapted to generate torque about their axes, the generation of torque by the sets of liquid retainer wheels being controllable for each set independently by means of the control means, by controlling the disposition of the fluid in the drum relatively to the sets of liquid retainer wheels.

2. A torque transmitter according to claim 1 in which the planet wheel sets are set at different distances from the drum axis.

3. A torque transmitter according to claim 1 in which the spacing of the liquid retainers away from the liquid retainer wheel axes of one set differ from the similar spacing of another liquid retainer wheel set.

4. A torque transmitter according to claim 1 in which the drum has at least one partition dividing it into a plurality of spaced compartments; separate sets of liquid retainer wheels being disposed in separate compartments.

5. A torque transmitter according to claim 4 in which the control means includes fluid control means for each compartment whereby the depth of a layer of fluid in each compartment may be controlled; each fluid control means comprising a duct having a leading inlet end for receiving fluid from the compartment and an outlet end outside the compartment, a reservoir, connections connecting the outlet end to the reservoir, and a control outside the drum for controlling the depth of immersion of the leading end of the duct, in the layer of fluid in the compartment and whereby the leading inlet end of the duct may be immersed in the layer of fluid and withdrawn from it and whereby liquid may be withdrawn from the compartment and charged into the reservoir, and vice versa.

6. A torque transmitter according to claim 4 in which the control means includes a passage connecting at least two compartments, a scoop within the drum, a control outside the drum and connected to the scoop for displacing it within the drum, whereby the depth of immersion of the scoop in an annular layer of fluid in the one compartment may be controlled and whereby fluid may be deflected by the scoop from the one compartment to the other via the passage during rotation of the drum.

7. A torque transmitter according to claim 4 in which bleed openings leading out of the liquid retainer wheels are provided to permit leakage of fluid from them during operation.

8. A torque transmitter which includes a carrier in the form of a drum adapted to contain hydraulic fluid and having at least one partition dividing it into a plurality of compartments; means for connecting the carrier to a source of rotary power; a plurality of liquid retainer wheels having each a plurality of liquid retainers spaced about its axis and mounted on the carrier in sets to rotate about their axes spaced away from and parallel to the drum axis, the separate sets of liquid retainer wheels being disposed in separate compartments; a sun wheel for each set of liquid retainer wheels and coaxial with the drum axis, an output shaft for each sun wheel and fast and coaxial with it, the output shafts of the several sun wheels including one or more sleeves around a central shaft; drive connecting means connecting each set of liquid retainer wheels to its associated sun wheel for the transmission of torque between liquid retainer wheels and sun wheels; whereby during rotation of the carrier about its axis causes liquid within the drum to be flung out under the action of centrifugal force into an annular layer around the drum periphery, and whereby relative rotation between an output shaft and the drum results in the liquid retainer wheels associated with that output shaft rotating about their axes and the liquid retainers of the liquid retainer wheels receiving liquid into them from the annular layer at a region in the drum on the remote side of the liquid retainer wheel axis relative to the drum axis and retaining liquid in them under the action of centrifugal force and rejecting retained liquid on the near side of the liquid retainer wheel relative to the drum axis.

9. A torque transmitter according to claim 8 in which bleed openings leading out of the liquid retainers are provided to permit leakage of fluid from them during operation.

10. A torque transmitter according to claim 8 in which the planet wheel sets are set at different distances from the drum axis.

11. A torque transmitter which includes a carrier in the form of a drum adapted to contain hydraulic fluid and having at least one partition dividing it into a plurality of compartments; means for connecting the carrier to a source of rotary power; a plurality of liquid retainer wheels having each a plurality of liquid retainers spaced about its axis and mounted on the carrier in set to rotate about their axes spaced away from and parallel to the drum axis, the separate sets of liquid retainer wheels being disposed in separate compartments; a sun wheel for each set of liquid retainer wheels and coaxial with the drum axis, an output shaft for each sun wheel and fast and coaxial with it, the output shafts of the several sun wheels including one or more sleeves around a central shaft; drive connecting means connecting each set of liquid retainer wheels to its associated sun wheel for the transmission of torque between liquid retainer wheels and sun wheels and comprising a toothed gear train including a toothed planet wheel fast and coaxial with a liquid retainer wheel and an idler wheel mounted to rotate about an axis parallel to the liquid retainer wheel and sun wheel axes; whereby rotation of the carrier about its axis causes liquid within the drum to be flung out under the action of centrifugal force into an annular layer around the drum periphery, and whereby relative rotation between an output shaft and the drum results in the liquid retainer wheels associated with that output shaft rotating about their axes and the liquid retainers of the liquid retainer wheels receiving liquid into them from the annular layer at a region in the drum on the remote side of the liquid retainer wheel axis relative to the drum axis and retaining liquid in them under the action of centrifugal force and rejecting retained liquid on the near side of the liquid retainer wheel relative to the drum axis.

12. A torque transmitter according to claim 11 in which the ratio of the pitch circle diameters of the planet and sun wheels vary from one set of liquid retainer wheels to another.

13. A torque transmitter which includes
(a) a carrier in the form of a drum adapted to contain hydraulic fluid and mounted to rotate about its axis;
(b) means for connecting the carrier to a source of rotary power;
(c) at least two sets of liquid retainer wheels in the drum, each liquid retainer wheel having a plurality of retainers spaced about its axis and being mounted on the carrier to rotate about its own axis which is spaced away from the carrier axis;
(d) for each set of liquid retainer wheels, a sun wheel coaxial with the carrier axis and mounted to rotate about its axis relatively to the carrier;
(e) for each sun wheel an output shaft fast and coaxial with the sun wheel, the several sun wheels and output shafts being coaxial;
(f) drive connecting means connecting each sun wheel with its set of associated liquid retainer wheels for the transmission of torque between the said liquid retainer wheels and the said sun wheel, and comprising a toothed gear train including a toothed planet wheel fast and coaxial with the liquid retainer wheel, and a toothed gear idler wheel meshing with the planet wheel, both the said wheels being mounted to rotate about axes parallel to the liquid retainer wheel and sun wheel axes, the ratio of the pitch circle diameters of the planet and sun wheels varying from one set of liquid retainer wheels to another, each set of retainer wheels and associated planet and idler wheels being mounted in dynamic balance about the carrier axis; and (g) control means to control the disposition of hydraulic fluid in the drum independently for each set of liquid retainer wheels, the fluid being flung out under the action of centrifugal force during rotation of the drum about its axis;

whereby, during rotation of the drum about its axis and of the liquid retainer wheels about their axes relatively to the drum, the retainers of the liquid retainer wheels are adapted to pass through the annular layer of liquid in the drum and to receive liquid into them from a region in the drum on the remote side of the liquid retainer wheel axis relative to the drum axis and to retain liquid in them under the action of centrifugal force and to reject retained liquid on the near side of the liquid retainer wheel axis relative to the drum axis; and whereby the sets of liquid retainer wheels are adapted to generate torque about their axes, the generation of torque by the sets of liquid retainer wheels being controllable for each set independently by means of the control means, by controlling the disposition of the fluid in the drum relatively to the set of liquid retainer wheels.

14. A torque transmitter according to claim 13 in which the drum has at least one partition dividing it into a plurality of spaced compartments, separate sets of liquid retainer wheels being disposed in separate compartments.

15. A torque transmitter according to claim 13 in which the planet wheel sets are set at different distances from the drum axis.

16. A torque transmitter according to claim 13 in which the spacing of the liquid retainers away from the liquid retainer wheel axes of one set differ from the similar spacing of another liquid retainer wheel set.

17. A torque transmitter according to claim 13 in which one of the output shafts is a main output shaft and the other output shafts are minor output shafts; and in which there are provided a gear train between each minor output shaft and the main output shaft, and clutch means for each gear train for drivingly connecting its associated minor output shaft with the main output shaft; whereby pre-selection of a gear train and engagement of its clutch means may take place while no torque is yet generated by its associated liquid retainer wheels.

18. A torque transmitter according to claim 17 in which a free wheel device is provided between the main output shaft and the carrier to prevent the main output shaft overrunning the carrier.

19. A torque transmitter according to claim 13 and which includes a major output shaft coaxial with the carrier and the output shafts having the sun wheels thereon, a gear train between each sun wheel output shaft and the major output shaft, and clutch means for each gear train for drivingly connecting its associated sun wheel output shaft with the major output shaft; whereby pre-selection of a gear train and engagement of its clutch means may take place while no torque is yet generated by its associated liquid retainer wheels.

20. A torque transmitter according to claim 19 in which a free wheel device is provided between the major output shaft and the carrier to prevent the major output shaft overrunning the carrier.

References Cited by the Examiner
UNITED STATES PATENTS

| 1,551,694 | 9/1925 | Reece et al. | 74—752 |
| 1,691,611 | 11/1928 | Reece et al. | 74—752 |
| 2,492,456 | 12/1949 | Becker | 74—732 |
| 3,077,793 | 2/1963 | Cancrinus | 74—752 |

DAVID J. WILLIAMOWSKY, *Primary Examiner.*

DON A. WAITE, *Examiner.*

R. D. GRAUER, *Assistant Examiner.*